US012719371B2

(12) United States Patent
Cai et al.

(10) Patent No.: US 12,719,371 B2
(45) Date of Patent: Aug. 25, 2026

(54) BACKPLANE AND POWER CONVERSION METHOD AND APPARATUS

(71) Applicant: Huawei Digital Power Technologies Co., Ltd., Shenzhen (CN)

(72) Inventors: Yi Cai, Dongguan (CN); Hua Yu, Dongguan (CN); Changlei Du, Dongguan (CN); Xiaoyu Liu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 161 days.

(21) Appl. No.: 18/774,019

(22) Filed: Jul. 16, 2024

(65) Prior Publication Data

US 2024/0372457 A1 Nov. 7, 2024

Related U.S. Application Data

(63) Continuation of application No. PCT/CN2022/129248, filed on Nov. 2, 2022.

(30) Foreign Application Priority Data

Jan. 20, 2022 (CN) ........................ 202210083900.1

(51) Int. Cl.
*H02M 3/158* (2006.01)
*H02M 1/00* (2006.01)
*H02M 3/04* (2006.01)

(52) U.S. Cl.
CPC ....... *H02M 3/1586* (2021.05); *H02M 1/0043* (2021.05); *H02M 3/04* (2013.01); *H02M 3/1584* (2013.01); *H02M 1/0048* (2021.05)

(58) Field of Classification Search
CPC .......................... H02M 3/1584; H02M 3/1586
See application file for complete search history.

(56) References Cited

U.S. PATENT DOCUMENTS 5,038,317 A 8/1991 Callan et al.
10,255,834 B2 * 4/2019 Cok .................... G09G 3/2003
2012/0169311 A1 7/2012 Malmberg et al.
2013/0322012 A1 12/2013 Dunwoody et al.
(Continued)

FOREIGN PATENT DOCUMENTS

CN 106329565 A 1/2017
CN 113872461 A 12/2021
(Continued)

*Primary Examiner* — Alex Torres-Rivera
(74) *Attorney, Agent, or Firm* — Maier & Maier, PLLC

(57) ABSTRACT

The embodiments provide a backplane and a power conversion method and apparatus. The power conversion apparatus includes a first power module, a second power module, and a controller. Each power module includes a signal processor and a corresponding power converter. The signal processor in the first power module sends a generated first carrier signal to the signal processor in the second power module. The signal processor in the second power module determines a second carrier signal by using a period of the first carrier signal, to drive the power converter in the first power module by using the first carrier signal, and drive the power converter in the second power module by using the second carrier signal. This improves operating efficiency of a device in a power conversion process and reduces a power loss.

16 Claims, 6 Drawing Sheets

(56) References Cited

U.S. PATENT DOCUMENTS

| | | | | |
|---|---|---|---|---|
| 2014/0091631 | A1* | 4/2014 | Naden | H02M 3/1584 307/82 |
| 2014/0268948 | A1* | 9/2014 | White | H02M 7/493 363/71 |
| 2016/0211771 | A1 | 7/2016 | Ichihara | |
| 2021/0099084 | A1* | 4/2021 | Cheng | H02M 1/0061 |
| 2022/0045605 | A1* | 2/2022 | Wu | H02M 3/1584 |
| 2023/0125514 | A1* | 4/2023 | Qi | H02M 7/49 363/13 |

FOREIGN PATENT DOCUMENTS

| | | | |
|---|---|---|---|
| CN | 114513110 | A | 5/2022 |
| WO | 2021233170 | A1 | 11/2021 |

* cited by examiner

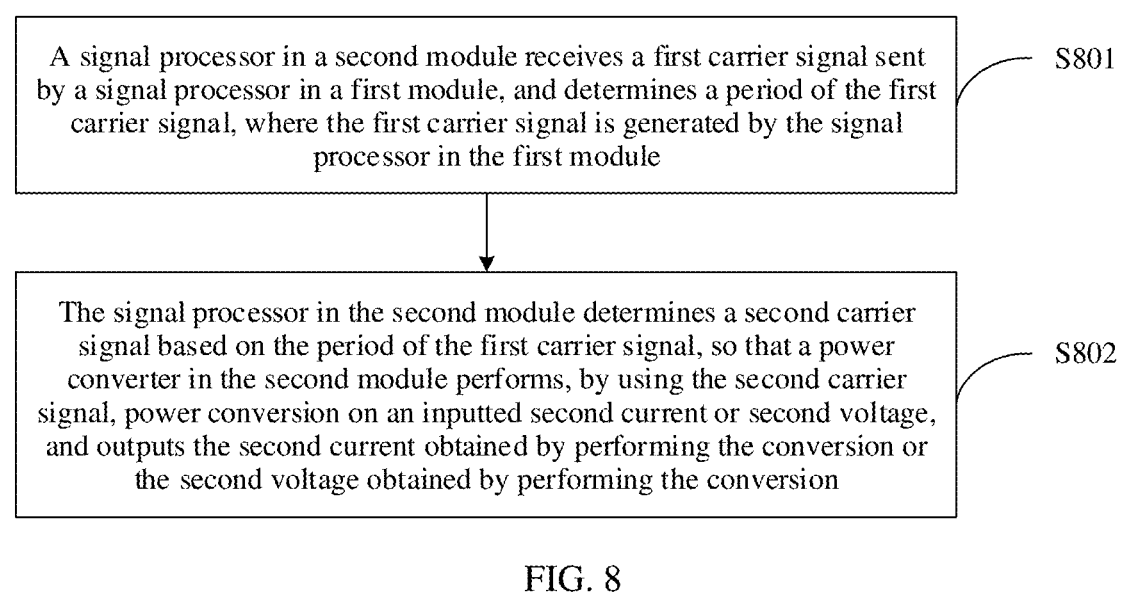

A signal processor in a second module receives a first carrier signal sent by a signal processor in a first module, and determines a period of the first carrier signal, where the first carrier signal is generated by the signal processor in the first module — S801

The signal processor in the second module determines a second carrier signal based on the period of the first carrier signal, so that a power converter in the second module performs, by using the second carrier signal, power conversion on an inputted second current or second voltage, and outputs the second current obtained by performing the conversion or the second voltage obtained by performing the conversion — S802

FIG. 8

BACKPLANE AND POWER CONVERSION METHOD AND APPARATUS

CROSS-REFERENCE TO RELATED APPLICATIONS

This application is a continuation of International Application No. PCT/CN2022/129248, filed on Nov. 2, 2022, which claims priority to Chinese Patent Application No. 202210083900.1, filed on Jan. 20, 2022. The disclosures of the aforementioned applications are hereby incorporated by reference in their entireties.

TECHNICAL FIELD

The embodiments relate to the field of electric energy conversion technologies and to a backplane and a power conversion method and apparatus.

BACKGROUND

Currently, for an apparatus that needs to perform power conversion, to meet an application scenario of high-power output, most power conversion apparatuses do not use single-channel power conversion, and one signal processor and multi-channel power conversion are installed on an existing backplane. An output power of the power conversion apparatus is increased through parallel connection of the multi-channel power conversion.

Generally, the multi-channel power conversion on the backplane is driven by using a plurality of carrier signals generated by a plurality of timers in the signal processor, and the plurality of timers in the same signal processor tend to generate associated signals. Therefore, carrier signals allocated by the multi-channel power conversion may be further adjusted based on the associated signals.

However, when the carrier signals allocated by the same signal processor are used to drive corresponding power converter, the associated signals generated by the plurality of timers in the same signal processor tend to forcibly change some power converter driving processes. As a result, operating efficiency of a device in a power conversion process is reduced, and a power loss is increased.

SUMMARY

In view of this, the embodiments provide a backplane and a power conversion method and apparatus, to improve operating efficiency of a device in a power conversion process, and reduce a power loss.

According to a first aspect, the embodiments provide a power conversion apparatus, including a first power module, a second power module, and a controller. Each power module includes a signal processor and a power converter. The signal processor is connected to the power converter. The controller is connected to the signal processor in each power module. The controller is configured to control the signal processor in each power module to be in an operating state. The signal processor in the first power module is configured to: generate a first carrier signal, drive the connected power converter based on the first carrier signal, and send the first carrier signal to the signal processor in the second power module. The power converter in the first power module is configured to: perform power conversion on an inputted first current or first voltage by using the first carrier signal, and output the first current obtained through the conversion or the first voltage obtained through the conversion. The signal processor in the second power module is configured to: receive the first carrier signal, and determine a period of the first carrier signal; and determine a second carrier signal based on the period of the first carrier signal. The power converter in the second power module is configured to: perform power conversion on an inputted second current or second voltage by using the second carrier signal, and output the second current obtained through the conversion or the second voltage obtained through the conversion.

Compared with the conventional technology in which one signal processor is used to control multi-channel power conversion, the power conversion apparatus provided in the embodiments includes a first power module, a second power module, and a controller. Each power module includes a signal processor and a corresponding power converter. The signal processor in the first power module sends a generated first carrier signal to the signal processor in the second power module. The signal processor in the second power module determines a second carrier signal by using a period of the first carrier signal, to drive the power converter in the first power module by using the first carrier signal, and drive the power converter in the second power module by using the second carrier signal. This improves operating efficiency of a device in a power conversion process and reduces a power loss.

In a possible implementation, the signal processor in the second power module is configured to: generate a third carrier signal, and perform phase-locking on the third carrier signal based on the period of the first carrier signal and a target phase difference, to obtain the second carrier signal, where the target phase difference is determined based on a quantity of power modules. In this implementation, after the target phase difference is determined by using the quantity of power modules, phase-locking is performed on the third carrier signal based on the period of the first carrier signal and the target phase difference, so that a fixed target phase difference exists between the second carrier signal and the first carrier signal that are obtained through phase-locking, and a fixed target phase difference exists between a power outputted by the power converter in the first power module based on the first carrier signal and a power outputted by the power converter in the second power module based on the second carrier signal. Therefore, it is ensured that a fixed phase difference is maintained between powers outputted by different power modules, to avoid a case in which indicators such as an output ripple and a thermal stress deteriorate because a phase difference between the powers outputted by the different power modules dynamically changes.

In a possible implementation, the signal processor in the second power module includes: a control loop, configured to: determine an initial reference phase based on the period of the first carrier signal and the quantity of power modules; generate a reference signal based on the reference phase; and send the reference signal to a signal superimposition module; and the signal superimposition module, configured to: superimpose the reference signal and the third carrier signal to obtain a superimposed signal; determine whether a phase difference between the superimposed signal and the first carrier signal is equal to the target phase difference; when the phase difference between the superimposed signal and the first carrier signal is not equal to the target phase difference, feed back the current phase difference between the superimposed signal and the first carrier signal to the control loop; and when the phase difference between the superimposed signal and the first carrier signal is equal to the target phase difference, send the superimposed signal as the second carrier signal to the power converter in the second power module, where the control loop is further configured to: correct the reference phase based on the current phase difference between the superimposed signal received from the signal superimposition module and the first carrier signal; and continue to generate the reference signal based on the corrected reference phase.

In the embodiments, when phase-locking is performed on the third carrier signal, the initial reference phase is first determined based on the period of the first carrier signal and the quantity of power modules by using the control loop in the signal processor of the second power module. After the reference signal is generated based on the reference phase, the reference signal and the third carrier signal are superimposed by using the signal superimposition module in the signal processor of the second power module. If the phase difference between the superimposed signal and the first carrier signal is not equal to the target phase difference, the current phase difference between the superimposed signal and the first carrier signal is fed back to the reference phase as a feedback value, to continue to generate a new reference signal, and superimpose the new reference signal and the third carrier signal until a phase difference between the new superimposed signal and the first carrier signal is equal to the target phase difference, that is, a phase-locking process of the third carrier signal is completed. The control loop is disposed, so that phase-locking can be performed on the third carrier signal more accurately.

In a possible implementation, the first power module is a primary power module, and the second power module is a secondary power module; and the signal processor in the first power module is further configured to: before sending the first carrier signal to the signal processor in the second power module, determine that an address of the first power module is a specified primary power module address. Power module addresses that respectively correspond to the first power module and the second power module are defined, so that a carrier signal generated by the signal processor in the primary power module can be accurately sent to the signal processor in the secondary power module.

In a possible implementation, there is one first power module, and there are a plurality of second power modules. The plurality of second power modules are disposed, so that a larger power value can be obtained through conversion by using the power conversion apparatus. In addition, a quantity of second power modules may be set according to a user requirement, to meet different power conversion requirements. A quantity of first power modules is set to 1, to ensure that each second power module is controlled by using a same first power module, so that a fixed target phase difference exists between a power outputted by the power converter in the first power module based on the first carrier signal and a power outputted by the power converter in each second power module based on the second carrier signal. Therefore, it is ensured that a fixed phase difference is maintained between powers outputted by different power modules, to avoid a case in which indicators such as an output ripple and a thermal stress deteriorate because a phase difference between the powers outputted by the different power modules dynamically changes.

In a possible implementation, the controller communicates and interacts with the signal processor in each power module through at least one of the following communication interfaces: a serial peripheral interface (SPI), a general purpose input/output (GPIO) interface, a bidirectional two-wire serial bus (I2C) interface, and a controller area network (CAN) interface. Different communication interfaces are disposed, so that the controller and the signal processor in each power module may select a communication interaction manner according to an actual case, and the controller controls the signal processor in each power module more accurately.

According to a second aspect, the embodiments further provide a backplane, including the power conversion apparatus according to the first aspect or any implementation of the first aspect. The controller in the power conversion apparatus is soldered on the backplane, and each power module is connected to the backplane by a pin.

According to a third aspect, the embodiments further provide a power conversion method applied to the power conversion apparatus according to the first aspect or any implementation of the first aspect. The method includes: a signal processor in a second power module receives a first carrier signal sent by a signal processor in a first power module, and determines a period of the first carrier signal, where the first carrier signal is generated by the signal processor in the first power module. The signal processor in the second power module determines a second carrier signal based on the period of the first carrier signal, so that a power converter in the second power module performs, by using the second carrier signal, power conversion on an inputted second current or second voltage, and outputs the second current obtained through the conversion or the second voltage obtained through the conversion.

In a possible implementation, that the signal processor in the second power module determines a second carrier signal based on the period of the first carrier signal includes: The signal processor in the second power module generates a third carrier signal, and performs phase-locking on the third carrier signal based on the period of the first carrier signal and a target phase difference, to obtain the second carrier signal, where the target phase difference is determined based on a quantity of power modules.

In a possible implementation, that the signal processor in the second power module performs phase-locking on the third carrier signal based on the period of the first carrier signal and a target phase difference, to obtain the second carrier signal includes: The signal processor in the second power module determines an initial reference phase based on the period of the first carrier signal and the quantity of power modules; and generates a reference signal based on the reference phase. The signal processor in the second power module superimposes the reference signal and the third carrier signal to obtain a superimposed signal; determines whether a phase difference between the superimposed signal and the first carrier signal is equal to the target phase difference; when the current phase difference between the superimposed signal and the first carrier signal is not equal to the target phase difference, feeds back the current phase difference between the superimposed signal and the first carrier signal to the reference phase, and corrects the reference phase; and continues to generate the reference signal based on the corrected reference phase; and uses the superimposed signal as the second carrier signal when the phase difference between the superimposed signal and the first carrier signal is equal to the target phase difference.

According to a fourth aspect, the embodiments provide a non-transitory computer-readable storage medium. The non-transitory computer-readable storage medium stores computer instructions. When the computer instructions are executed by a signal processor in a second power module of a power conversion apparatus, the signal processor in the second power module may be enabled to perform the method according to any implementation of the third aspect.

According to a fifth aspect, the embodiments provide a computer program product. The computer program product includes computer instructions. When the computer instructions are executed by a signal processor in a second power module of a power conversion apparatus, the signal processor in the second power module may be enabled to perform the method according to any implementation of the third aspect.

For effects that can be achieved by any possible implementation of any one of the second aspect to the fifth aspect, refer to descriptions of effects that can be achieved by any possible implementation of the first aspect. Details are not described herein again.

BRIEF DESCRIPTION OF DRAWINGS

FIG. 8 is a schematic flowchart of a power conversion method according to an embodiment.

DETAILED DESCRIPTION OF EMBODIMENTS

To make persons of ordinary skill in the art understand the solutions of the embodiments better, the following clearly describes solutions in the embodiments with reference to the accompanying drawings.

It should be noted that, the terms "first", "second", and so on in the embodiments and accompanying drawings are intended to distinguish between similar objects but do not necessarily indicate a specific order or sequence. It should be understood that the data termed in such a way are interchangeable in proper circumstances so that embodiments described herein can be implemented in an order other than the orders illustrated or described herein. Implementations described in the following example embodiments do not represent all possible implementations. On the contrary, the implementations are merely examples of apparatuses and methods that are described in detail and that are consistent with some aspects of the embodiments.

The following describes some terms in embodiments to facilitate understanding of persons skilled in the art.

(1) In the embodiments, the term "a plurality of" means two or more, and another quantifier is similar to this.

(2) A power module is a module obtained by combining power electronic components based on particular functions. For example, both a first power module and a second power module in the embodiments are modules obtained by combining a signal processor and a power converter.

Figure 1:
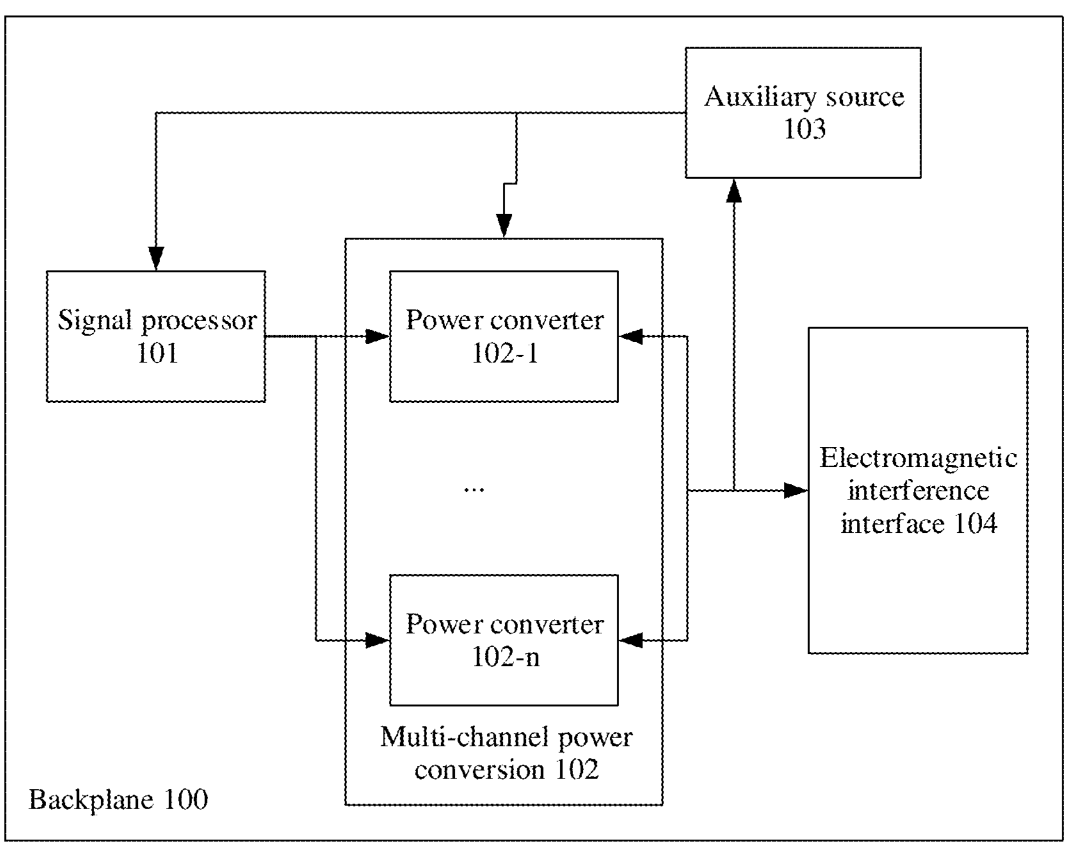
FIG. 1 is a schematic diagram of a structure of an integrated connection between a backplane and power converters in the conventional technology.

Currently, for an apparatus that needs to perform power conversion, to meet an application scenario of high-power output, most power conversion apparatuses do not use single-channel power conversion. As shown in FIG. 1, one signal processor 101 and a multi-channel power conversion 102 (for example, a power converter 102-1, . . . , and a power converter 102-*n* shown in FIG. 1) are installed on an existing backplane 100. The power converter 102-1, . . . , and the power converter 102-*n* are connected in parallel, so that an output power of the power conversion apparatus is increased. The signal processor 101 is connected to the power converter 102-1, . . . , and the power converter 102-*n*, and the signal processor 101, the power converters 102-1, . . . , and the power converters 102-*n* are all soldered on the backplane 100.

Generally, the power converter 102-1, . . . , and the power converter 102-*n* on the backplane 100 are respectively driven by using a plurality of carrier signals generated by a plurality of timers in the signal processor 101, and the plurality of timers in the same signal processor 101 tend to generate associated signals. Therefore, carrier signals allocated by the power converter 102-1, . . . , and the power converter 102-*n* may be further adjusted based on the associated signals.

Figures 2, 3:
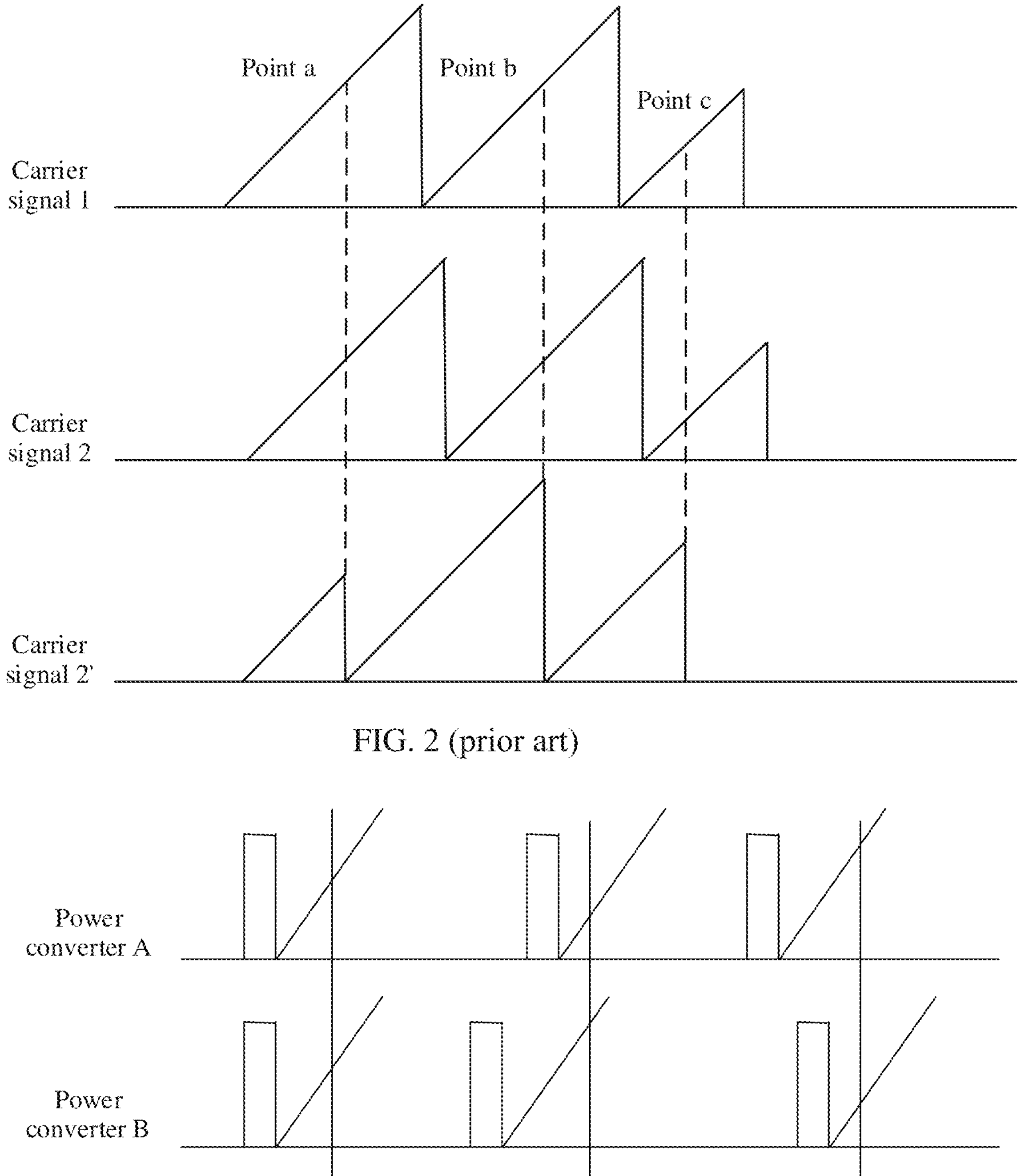
FIG. 2 is a schematic signal diagram of a carrier signal 1 and a carrier signal 2 that are allocated by a signal processor and a carrier signal 2' obtained by forcibly changing a signal in the conventional technology.
FIG. 3 is a schematic diagram of changes in a phase difference between a power converter A and a power converter B in the conventional technology.

However, when the carrier signals allocated by the same signal processor 101 are used to drive the power converter 102-1, . . . , and the power converter 102-*n*, the associated signals generated by the plurality of timers in the same signal processor 101 tend to forcibly change driving processes of some power converters. As a result, operating efficiency of a device in a power conversion process is reduced, and a power loss is increased. FIG. 2 shows a carrier signal 1 and a carrier signal 2 that are allocated by a signal processor 101 and a carrier signal 2' obtained by forcibly changing a signal. After allocating the carrier signal 1 to a power converter A, the signal processor 101 drives the power converter A based on the carrier signal 1. After allocating the carrier signal 2 to a power converter B, the signal processor 101 drives the power converter B based on the carrier signal 2. If phase differences between output results corresponding to the power converter A and the power converter B are a point a, a point b, and a point c on the carrier signal 1 in FIG. 2 due to impact of the associated signals generated by the plurality of timers in the same signal processor 101, the carrier signal 2 is forcibly changed based on the point a, the point b, and the point c in FIG. 2 without changing the carrier signal 1, and becomes the carrier signal 2' obtained by forcibly changing the signal in FIG. 2.

In addition, after the carrier signal 2' in the power converter B is adjusted again by using the association signals generated by the plurality of timers in the same signal processor 101, when the power converter B is driven by using the adjusted carrier signal 2', a phase of an output result obtained through power conversion by the power converter B tends to be over-adjusted, and as a result, phase differences between a plurality of output results of a plurality of power converters are increased. FIG. 3 is a schematic diagram of changes in a phase difference between a power converter A and a power converter B. As shown in FIG. 3, at a moment t1, based on the impact of the associated signals generated by the plurality of timers in the same signal processor 101, a phase difference between output results of the power converter A and the power converter B is C1.

After a carrier signal in the power converter B is adjusted again by using the associated signals, a phase difference between output results of the power converter A and the power converter B at a moment t2 is C2 or C3.

It should be noted that, an auxiliary source 103, an electromagnetic interference (EMI) interface 104, and other apparatuses are further soldered on the backplane 100 in FIG. 1. Specific functions of each apparatus are described below in detail, and are not described herein again.

In view of this, embodiments provide a backplane and a power conversion method and apparatus. To make objectives, solutions, and advantages of the embodiments n clearer, the following further describes the embodiments in detail with reference to the accompanying drawings.

Figure 4:
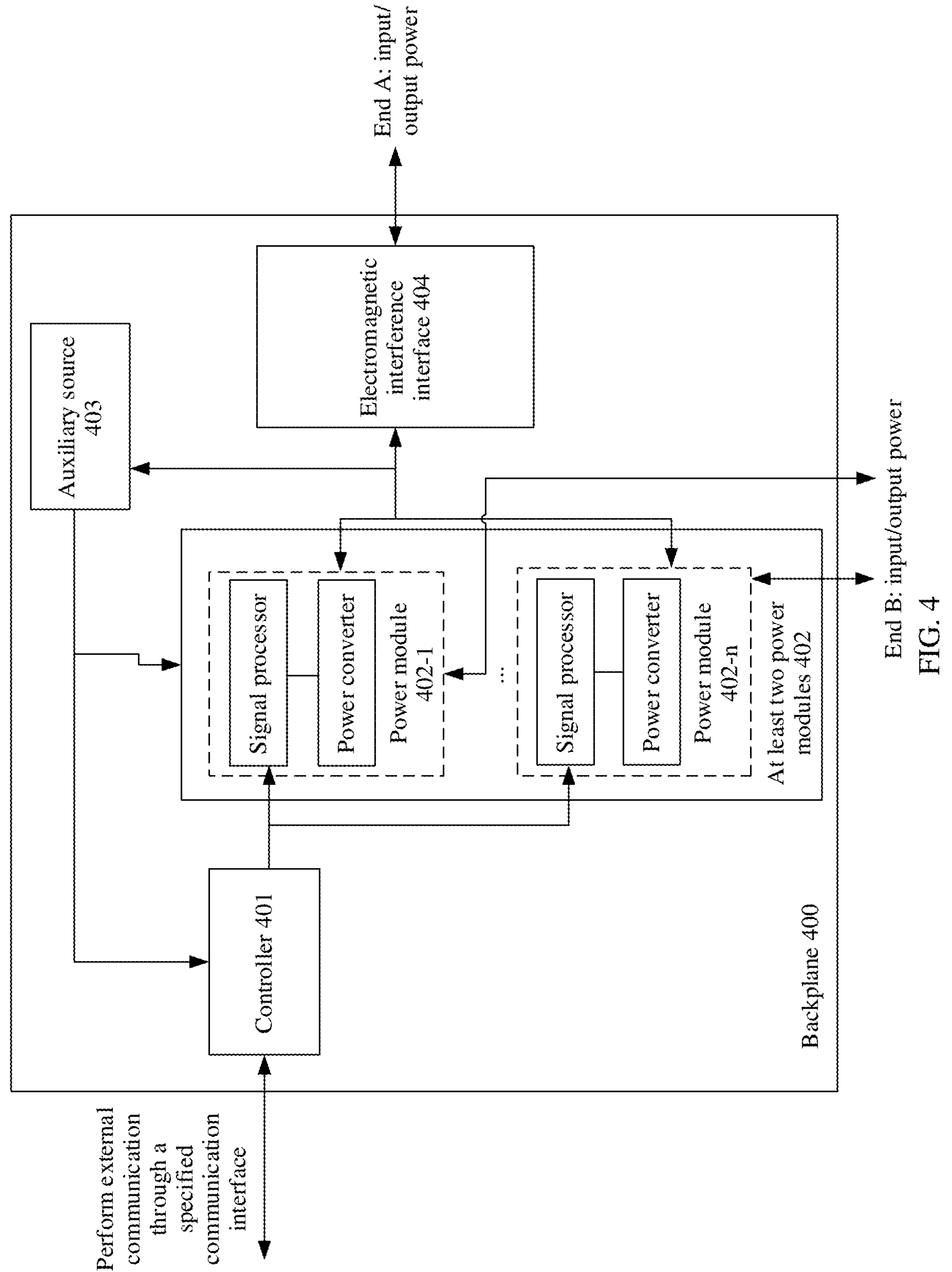
FIG. 4 is a schematic diagram of a structure of a power conversion apparatus according to an embodiment.

FIG. 4 is a schematic diagram of a structure of a power conversion apparatus according to an embodiment. As shown in FIG. 4, the power conversion apparatus includes a controller 401 and at least two power modules 402 (for example, a power module 402-1, . . . , and a power module **402-*n* shown in FIG. 4**). n is a positive integer.

Optionally, the controller 401 is soldered on a backplane 400, and the at least two power modules 402 are connected to the backplane 400 by pins. During actual application, a quantity of power modules 402 connected to the backplane 400 by pins may be adaptively adjusted based on a to-be-converted power value. For example, it is assumed that a power value that can be converted by each power module 402 is 30 W, and the to-be-converted power value is 60 W. In this case, two power modules 402 need to be connected to the backplane 400 by pins.

Each power module 402 includes a signal processor and a power converter. The signal processor is connected to the power converter. The controller 401 is connected to the signal processor in the power module 402-1, . . . , and the signal processor in the power module **402-*n***.

In embodiments, the controller 401 may control the signal processor in the power module 402-1, . . . , and the signal processor in the power module **402-*n* to be in an operating state. The controller 401 communicates and interacts with the signal processor in each power module 402 through at least one communication interface in a serial peripheral interface (SPI), a general purpose input/output (GPIO) interface, a bidirectional two-wire serial bus (I2C) interface, and a controller area network (CAN) interface. This is merely an example for description. A specific communication manner between the controller 401 and the signal processor in each power module 402** is not limited.

In addition, the controller 401 may control, within a specified frequency range (for example, 20 kHz to 500 kHz), the signal processor in the power module 402-1, . . . , and the signal processor in the power module **402-*n*, so that frequencies of signals generated by the signal processor in the power module 402-1, . . . , and the signal processor in the power module 402-*n*** are same, and phases of the signals are different.

Before communicating with the signal processor in the power module 402-1, . . . , and the signal processor in the power module **402-*n*, the controller 401 may first define power module addresses that correspond to the power modules 402-1, . . . , and the power module 402-*n*. For example, the power module address corresponding to the power module 402-1 may be preset to an address 0, and the power module address corresponding to the power module 402-*n* may be preset to an address 1. A user or a manufacturer may set the power module address corresponding to the power module 402-1 as a primary power module address, and set the power module address corresponding to each power module other than the power module 402-1** as a secondary power module address. In other words, a power module corresponding to the address 0 is set as a primary power module, and a power module corresponding to the address 1 is set as a secondary power module.

After the primary and secondary power modules corresponding to the power modules 402-1, . . . , and the power modules **402-*n* are determined, for example, a first power module is used to represent the primary power module, and a second power module is used to represent the secondary power module. If the power module 402-1 is the primary power module and the power module 402-*n* is the secondary power module according to the foregoing example, after the controller 401 controls each power module 402 to start power conversion, the signal processor in the power module 402-1 generates a first carrier signal, drives, by using the first carrier signal, a field effect transistor in the connected power converter, and sends the first carrier signal to the signal processor in the power module 402-*n***.

After receiving the first carrier signal of the signal processor in the power module 402-1, the signal processor in the power module **402-*n* determines a period of the first carrier signal, and determines a target phase difference based on the quantity of power modules 402. For example, when the quantity of power modules 402 is N (N is a positive integer) and the power converter in each power module 402 is a direct current-direct current (DC-DC) power converter, the target phase difference is 360°/N. For example, when N is 2, the target phase difference is 180°. When N is 3, the target phase difference is 120°. After the magnitude of the corresponding target phase difference is determined based on a specific quantity of power modules 402, phase-locking may be accurately performed on a carrier signal in the signal processor of the power module 402-*n*** by using the target phase difference.

It should be noted that, for different types of power converters in the power module 402, calculation manners of determining the target phase difference are different. A specific calculation manner of determining the target phase difference for different types of power converters in the power module 402 is not limited.

In an implementation, the signal processor in the power module **402-*n* may further generate a third carrier signal (that is, an original carrier signal that is not processed). The signal processor in the power module 402-*n* may perform phase-locking on the third carrier signal based on the target phase difference and a loop shown in FIG. 5**, to obtain a second carrier signal.

Figure 5:
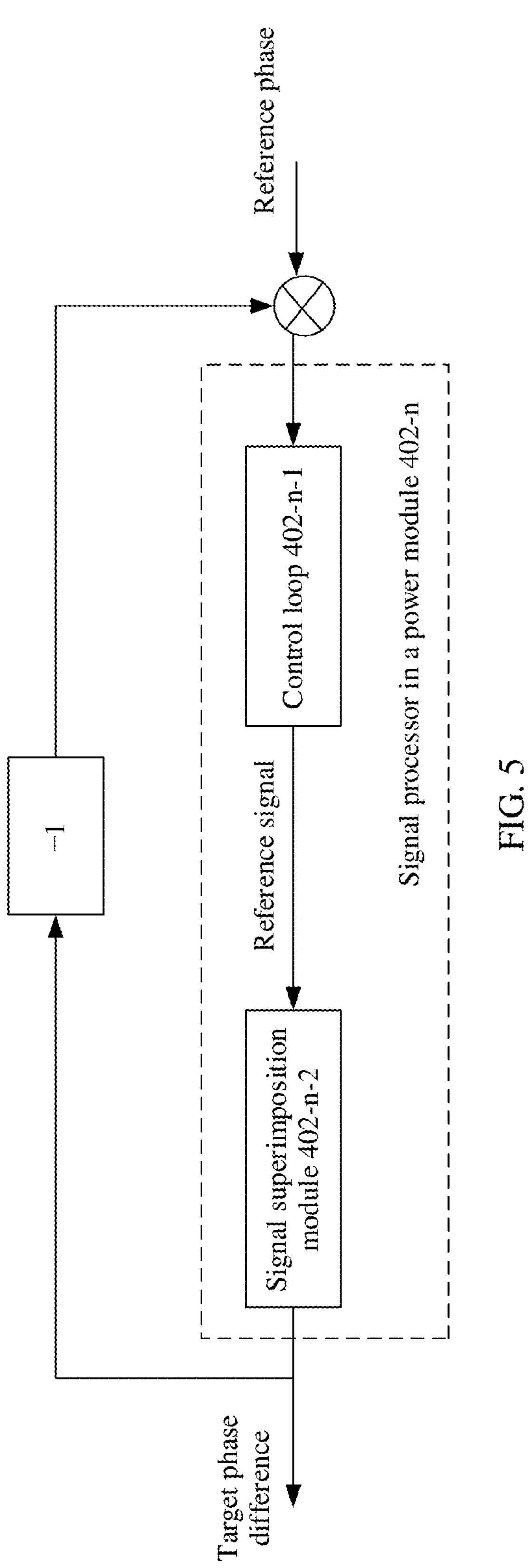
FIG. 5 is a schematic diagram of performing phase-locking on a third carrier signal based on a target phase difference according to an embodiment.

As shown in FIG. 5, the signal processor in the power module **402-*n* may include a control loop 402-*n*-1 and a signal superimposition module 402-*n*-2. A process in which the signal processor in the power module 402-*n*** performs phase-locking on the third carrier signal is as follows:

The control loop **402-*n*-1 may determine an initial reference phase based on the period of the first carrier signal and the quantity of power modules, generate a reference signal based on the initial reference phase, and send the reference signal to the signal superimposition module 402-*n*-2**. For example, the period of the first carrier signal is represented by T, and two power modules are provided. In this case, the initial reference phase satisfies T/2.

The signal superimposition module **402-*n*-2 may superimpose the reference signal and the third carrier signal to obtain a superimposed signal; when a phase difference between the superimposed signal and the first carrier signal is not equal to the target phase difference, feed back the current phase difference between the superimposed signal and the first carrier signal to the control loop 402**-*n*-1; and correct a reference phase in the control loop 402-*n*-1 based on the current phase difference between the superimposed signal and the first carrier signal, and continue to generate the reference signal based on the corrected reference phase. For example, a difference between the initial reference phase and the current phase difference between the superimposed signal and the first carrier signal is used as the corrected reference phase. Then, the new reference signal continues to be superimposed with the third carrier signal, to obtain a new superimposed signal until the phase difference between the superimposed signal and the first carrier signal is equal to the target phase difference, and the superimposed signal is used as the second carrier signal and sent to the power converter in the power module 402-*n*. Therefore, a cyclic process of performing phase-locking on the third carrier signal based on the target phase difference to obtain the second carrier signal is completed. A phase difference between the second carrier signal and the first carrier signal is the target phase difference.

Figure 6:
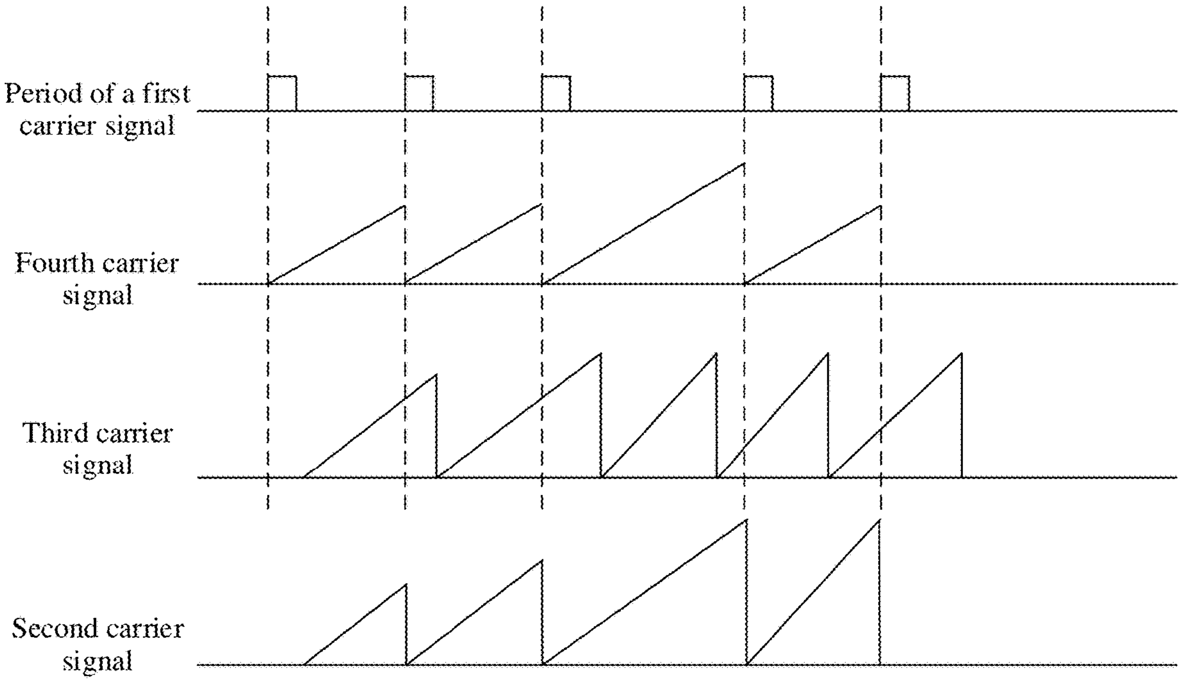
FIG. 6 is a schematic diagram in which a signal processor in a power module 402-*n* adjusts a third carrier signal based on a first carrier signal of a signal processor in a power module 402-1 according to an embodiment.
Figure 7:
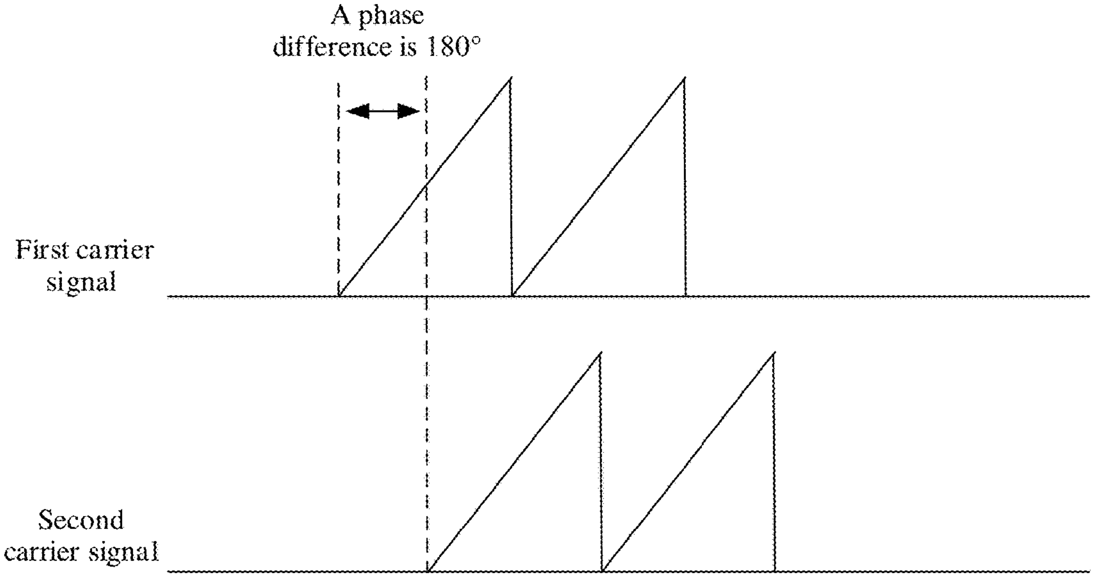
FIG. 7 is a schematic diagram in which a phase difference between a first carrier signal and a second carrier signal is 180° according to an embodiment.

FIG. 6 is a schematic diagram in which a signal processor in a power module 402-*n* adjusts a third carrier signal based on a first carrier signal of a signal processor in a power module 402-1. The signal processor in the power module 402-*n* first replicates the period of the first carrier signal generated by the signal processor in the power module 402-1, to obtain a fourth carrier signal. A period of the fourth carrier signal is the same as the period of the first carrier signal. Then, the third carrier signal is adjusted based on the fourth carrier signal, and after phase-locking is completed according to the foregoing description, the obtained adjusted third carrier signal is the second carrier signal. FIG. 7 is a schematic diagram in which a phase difference between a first carrier signal and a second carrier signal is 180°.

In addition, the power converter in the power module 402-1 is configured to: perform power conversion on an inputted first current or first voltage by using the first carrier signal, and output the first current obtained through the conversion or the first voltage obtained through the conversion. The power converter in the power module 402-*n* performs power conversion on an inputted second current or second voltage by using the second carrier signal, and outputs the second current obtained through the conversion or the second voltage obtained through the conversion. A phase difference between a power outputted by the power converter in the power module 402-*n* and a power outputted by the power converter in the power module 402-1 is a fixed target phase difference, to avoid a phenomenon in which indicators such as an output ripple and a thermal stress deteriorate because the phase difference dynamically changes.

The control loop 402-*n*-1 may be a proportional integral loop. This is merely an example for description herein. A specific control loop 402-*n*-1 is not limited. The controller 401, the signal processor in the power module 402-1, . . . , and the signal processor in the power module 402-*n* may be digital signal processors (DSP). The power converter in the power module 402-1, . . . , and the power converter in the power module 402-*n* may be DC-DC power converters. Each DC-DC power converter includes a plurality of topologies, for example, a bidirectional forward converter, a bidirectional flyback converter, a bidirectional push-pull converter, an H-bridge bidirectional converter, and a bidirectional full-bridge (DAB) converter.

When the power converter is a DC-DC power converter, energy transfer between different direct current voltage levels or current levels may be implemented. For example, before the DC-DC power converter is configured for an apparatus A, an output direct current voltage range is 24 V to 44.4 V. After the DC-DC power converter is configured for the apparatus A, an output direct current voltage range is 48 V to 57 V. In another example, before the DC-DC power converter is configured for an apparatus B, a power of a load side needs to be reduced when two apparatuses B are connected in parallel. However, after the DC-DC power converter is configured for each apparatus B, the power of the load side does not need to be reduced when the two apparatuses B are connected in parallel.

As shown in FIG. 4, an auxiliary source 403, an electromagnetic interference interface 404, and the like may be further soldered on the backplane 400. The auxiliary source 403 may be connected to the controller 401, the power module 402-1, . . . , the power module 402-*n*, and the electromagnetic interference interface 404. After receiving an instruction of a to-be-converted power, the electromagnetic interference interface 404 controls the auxiliary source 403 to start operating, and then the auxiliary source 403 may supply power to the controller 401, the power module 402-1, . . . , and the power module 402-*n*. As shown in FIG. 4, an end A is connected to the electromagnetic interference interface 404, and an end B is connected to interfaces corresponding to the power converter in the power module 402-1, . . . , and the power converter in the power module 402-*n*. When the to-be-converted power is inputted through the end A, a power obtained through conversion may be outputted through the end B. When the to-be-converted power is inputted through the end B, the power obtained through conversion may be outputted through the end A. That is, the end A and the end B may perform power conversion mutually. The controller 401 may further perform external communication through a specified communication interface. The auxiliary source 103 in FIG. 1 has a same function as the auxiliary source 403 in FIG. 4, and the electromagnetic interference interface 104 in FIG. 1 has a same function as the electromagnetic interference interface 404 in FIG. 4.

An embodiment provides a power conversion apparatus. In this solution, the power conversion apparatus includes a first power module, a second power module, and a controller. Each power module includes a signal processor and a corresponding power converter. The signal processor in the first power module sends a generated first carrier signal to the signal processor in the second power module. The signal processor in the second power module determines a second carrier signal by using a period of the first carrier signal, to drive the power converter in the first power module by using the first carrier signal, and drive the power converter in the second power module by using the second carrier signal. This improves operating efficiency of a device in a power conversion process and reduces a power loss.

In addition, in the embodiments, the power module 402-1, . . . , and the power module 402-*n* are all connected to the backplane 400 by pins. Therefore, the power modules on the backplane 400 are detachable, and different quantities of power modules are installed to implement backplanes with different functions, to resolve problems in the conventional technology that when the power modules are integrated with the backplane, if backplanes with different functions are required, corresponding backplanes need to be designed one by one, causing an increase in costs, and the entire backplane needs to be repaired when a problem occurs in a power module. In addition, in the embodiments, the power modules are connected to the backplane by pins, to resolve a case in the conventional technology in which the power modules are excessively coupled to another component because the power modules are integrally connected to the backplane. A signal processor is added to each power module, to resolve a case in the conventional technology in which a requirement on a signal processor is high when one signal processor on a backplane controls multi-channel power conversion.

Based on the foregoing embodiment, for a case in which the power converter is applied to a lithium battery product, the controller 401 in FIG. 4 may be a battery management system (BMS), and the BMS performs external communication through a CAN interface or an RS485 interface. The end B may input the to-be-converted power by using an electrochemical cell package temperature sensor, an electrochemical cell heater, or the like. The end A may be a busbar, and output the converted power through the busbar. Optionally, the power converter may be used in an inverter product.

Based on the foregoing embodiment of the power conversion apparatus, an embodiment further provides a power conversion method, applied to the power conversion apparatus. The method may be performed by the signal processor in the power module 402-*n* (that is, the second power module) in FIG. 4. As shown in FIG. 8, the method provided in the embodiments includes the following steps.

S801: A signal processor in a second power module receives a first carrier signal sent by a signal processor in a first power module, and determines a period of the first carrier signal, where the first carrier signal is generated by the signal processor in the first power module.

S802: The signal processor in the second power module determines a second carrier signal based on the period of the first carrier signal, so that a power converter in the second power module performs, by using the second carrier signal, power conversion on an inputted second current or second voltage, and outputs the second current obtained by performing the conversion or the second voltage obtained by performing the conversion.

In a possible implementation, that the signal processor in the second power module determines a second carrier signal based on the period of the first carrier signal in step S802 includes the following step.

The signal processor in the second power module generates a third carrier signal, and performs phase-locking on the third carrier signal based on the period of the first carrier signal and a target phase difference, to obtain the second carrier signal, where the target phase difference is determined based on a quantity of power modules.

In a possible implementation, that the signal processor in the second power module performs phase-locking on the third carrier signal based on the period of the first carrier signal and a target phase difference, to obtain the second carrier signal in step S802 includes the following steps.

The signal processor in the second power module determines an initial reference phase based on the period of the first carrier signal and the quantity of power modules; and generates a reference signal based on the reference phase.

The signal processor in the second power module superimposes the reference signal and the third carrier signal to obtain a superimposed signal; determines whether a phase difference between the superimposed signal and the first carrier signal is equal to the target phase difference; when the current phase difference between the superimposed signal and the first carrier signal is not equal to the target phase difference, feeds back the current phase difference between the superimposed signal and the first carrier signal to the reference phase, and corrects the reference phase; and continues to generate the reference signal based on the corrected reference phase; and uses the superimposed signal as the second carrier signal when the phase difference between the superimposed signal and the first carrier signal is equal to the target phase difference.

An embodiment further provides a non-transitory computer-readable storage medium. The non-transitory computer-readable storage medium stores computer instructions. When the computer instructions are executed by a signal processor in a second power module of a power conversion apparatus, the power conversion method shown in FIG. 8 may be performed.

An embodiment further provides a computer program product, including computer instructions. When the computer instructions are executed by a signal processor in a second power module of a power conversion apparatus, the power conversion method shown in FIG. 8 may be performed.

In other words, each aspect of the power conversion method provided in the embodiments may be further implemented in a form of a program product, and the program product includes program code. When the program code is run on a computer device or a circuit product, the program code is used to enable the computer device to perform the steps in the power conversion method described above.

In addition, although the operations of the method in the embodiments are described in the accompanying drawings in a particular order, it is not required or implied that the operations need to be performed in a particular order or that all of the operations shown need to be performed to achieve the desired result. Additionally or alternatively, some steps may be omitted, a plurality of steps may be combined into one step for execution, and/or one step may be divided into a plurality of steps for execution.

Persons skilled in the art should understand that the embodiments may be provided as a method, a system, or a computer program product. Therefore, the embodiments may use a form of a hardware-only embodiment, a software-only embodiment, or an embodiment with a combination of software and hardware. In addition, the embodiments may use a form of a computer program product implemented on one or more computer-usable storage media (including, but not limited to, a disk memory, a CD-ROM, an optical memory, and the like) that include computer-usable program code.

The embodiments are described with reference to the flowcharts and/or the block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a non-transitory computer-readable memory that can instruct the computer or any other programmable data processing device to work in a specific manner, so that the instructions stored in the non-transitory computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that persons skilled in the art can make various modifications and variations to the embodiments without departing from their scope. The embodiments are intended to cover these modifications, variations and their equivalent technologies.

What is claimed is:

1. A power conversion apparatus, comprising:

a first power module;

a second power module; and a controller, wherein each power module comprises a signal processor and a power converter, the signal processor is connected to the power converter, and the controller is connected to the signal processor in each power module, and the controller is configured to:

control the signal processor in each power module to be in an operating state;

the signal processor in the first power module is configured to:

generate a first carrier signal, drive the connected power converter based on the first carrier signal, and send the first carrier signal to the signal processor in the second power module; the power converter in the first power module is configured to:

perform power conversion on an inputted first current or first voltage by using the first carrier signal, and output a first output current obtained through the conversion or a first output voltage obtained through the conversion;

the signal processor in the second power module is configured to:

receive the first carrier signal, determine a period of the first carrier signal, and determine a second carrier signal based on the period of the first carrier signal; and the power converter in the second power module is configured to:

perform power conversion on an inputted second current or second voltage by using the second carrier signal, and output a second output current obtained through the conversion or a second output voltage obtained through the conversion, wherein the signal processor in the second power module is further configured to:

generate a third carrier signal, and perform phase-locking on the third carrier signal based on the period of the first carrier signal and a target phase difference to obtain the second carrier signal, wherein the target phase difference is determined based on a quantity of power module.

2. The power conversion apparatus according to claim 1, wherein the signal processor in the second power module further comprises: a control loop configured to:

determine an initial reference phase based on the period of the first carrier signal and the quantity of power modules, generate a reference signal based on the reference phase, send the reference signal to a signal superimposition module; and the signal superimposition module is configured to:

superimpose the reference signal and the third carrier signal to obtain a superimposed signal;

determine whether a phase difference between the superimposed signal and the first carrier signal is equal to the target phase difference, and when the phase difference between the superimposed signal and the first carrier signal is not equal to the target phase difference, feed back the phase difference between the superimposed signal and the first carrier signal to the control loop; and when the phase difference between the superimposed signal and the first carrier signal is equal to the target phase difference, send the superimposed signal as the second carrier signal to the power converter in the second power module.

3. The power conversion apparatus according to claim 2, wherein the control loop is further configured to:

correct the reference phase based on the phase difference between the superimposed signal received from the signal superimposition module and the first carrier signal; and continue to generate the reference signal based on the corrected reference phase.

4. The power conversion apparatus according to claim 1, wherein the first power module is a primary power module, the second power module is a secondary power module, and the signal processor in the first power module is further configured to:

before sending the first carrier signal to the signal processor in the second power module, determine that an address of the first power module is a specified primary power module address.

5. The power conversion apparatus according to claim 1, wherein there is one first power module and there is a plurality of second power modules.

6. The power conversion apparatus according to claim 1, wherein the controller communicates and interacts with the signal processor in each power module through at least one of the following communication interfaces: a serial peripheral interface (SPI), a general purpose input/output (GPIO) interface, a bidirectional two-wire serial bus (I2C) interface, and a controller area network (CAN) interface.

7. A backplane comprising:

a power conversion apparatus that comprises a first power module, a second power module, and a controller, wherein the controller is soldered on the backplane, each power module is connected to the backplane by a pin, each power module comprises a signal processor and a power converter, the signal processor is connected to the power converter, and the controller is connected to the signal processor in each power module, and the controller is configured to:

control the signal processor in each power module to be in an operating state;

the signal processor in the first power module is configured to:

generate a first carrier signal, drive the connected power converter based on the first carrier signal, and send the first carrier signal to the signal processor in the second power module;

the power converter in the first power module is configured to:

perform power conversion on an inputted first current or first voltage by using the first carrier signal, and output a first output current obtained through the conversion or a first output voltage obtained through the conversion;

the signal processor in the second power module is configured to:

receive the first carrier signal, determine a period of the first carrier signal, and determine a second carrier signal based on the period of the first carrier signal; and the power converter in the second power module is configured to:

perform power conversion on an inputted second current or second voltage by using the second carrier signal, and output a second output current obtained through the conversion or a second output voltage obtained through the conversion, wherein the signal processor in the second power module is further configured to:

generate a third carrier signal, and perform phase-locking on the third carrier signal based on the period of the first carrier signal and a target phase difference to obtain the second carrier signal, wherein the target phase difference is determined based on a quantity of power modules.

8. The backplane according to claim 7, wherein the signal processor in the second power module further comprises a control loop configured to:

determine an initial reference phase based on the period of the first carrier signal and the quantity of power modules, generate a reference signal based on the reference phase, send the reference signal to a signal superimposition module; and the signal superimposition module is configured to:

superimpose the reference signal and the third carrier signal to obtain a superimposed signal, and determine whether a phase difference between the superimposed signal and the first carrier signal is equal to the target phase difference, and when the phase difference between the superimposed signal and the first carrier signal is not equal to the target phase difference, feed back the phase difference between the superimposed signal and the first carrier signal to the control loop; and when the phase difference between the superimposed signal and the first carrier signal is equal to the target phase difference, send the superimposed signal as the second carrier signal to the power converter in the second power module.

9. The backplane according to claim 8, wherein the control loop is further configured to:

correct the reference phase based on the phase difference between the superimposed signal received from the signal superimposition module and the first carrier signal; and continue to generate the reference signal based on the corrected reference phase.

10. The backplane according to claim 7, wherein the first power module is a primary power module, the second power module is a secondary power module; and the signal processor in the first power module is further configured to:

before sending the first carrier signal to the signal processor in the second power module, determine that an address of the first power module is a specified primary power module address.

11. The backplane according to claim 7, wherein there is one first power module and there is a plurality of second power modules.

12. The backplane according to claim 7, wherein the controller communicates and interacts with the signal processor in each power module through at least one of the following communication interfaces: a serial peripheral interface (SPI), a general purpose input/output (GPIO) interface, a bidirectional two-wire serial bus (I2C) interface, and a controller area network (CAN) interface.

13. A power conversion method, applied to a power conversion apparatus, the power conversion apparatus comprises a first power module, a second power module, and a controller, each power module comprises a signal processor and a power converter, the signal processor is connected to the power converter, the controller is connected to the signal processor in each power module; the controller is configured to control the signal processor in each power module to be in an operating state; and the power conversion method comprises:

receiving, by a signal processor in the second power module, a first carrier signal sent by a signal processor in the first power module, and determining a period of the first carrier signal, wherein the first carrier signal is generated by the signal processor in the first power module; and determining, by the signal processor in the second power module, a second carrier signal based on the period of the first carrier signal, so that a power converter in the second power module performs, by using the second carrier signal, power conversion on an inputted second current or second voltage, and outputs a second output current obtained through the power conversion or a second output voltage obtained through the conversion, wherein determining, by the signal processor in the second power module, the second carrier signal based on the period of the first carrier signal further comprises:

generating, by the signal processor in the second power module, a third carrier signal, and performing phase-locking on the third carrier signal based on the period of the first carrier signal and a target phase difference to obtain the second carrier signal, wherein the target phase difference is determined based on a quantity of power modules.

14. The power conversion method according to claim 13, wherein performing, by the signal processor in the second power module, the phase-locking on the third carrier signal based on the period of the first carrier signal and the target phase difference to obtain the second carrier signal further comprises:

determining, by the signal processor in the second power module, an initial reference phase based on the period of the first carrier signal and the quantity of power modules; and generating a reference signal based on the reference phase;

superimposing, by the signal processor in the second power module, the reference signal and the third carrier signal to obtain a superimposed signal; determining whether a phase difference between the superimposed signal and the first carrier signal is equal to the target phase difference.

15. The power conversion method according to claim 14, when the phase difference between the superimposed signal and the first carrier signal is not equal to the target phase difference, feeding back the phase difference between the superimposed signal and the first carrier signal to the reference phase;

correcting the reference phase; and continuing to generate the reference signal based on the corrected reference phase.

16. The power conversion method according to claim 14, when the first carrier signal is equal to the target phase difference, using the superimposed signal as the second carrier signal.

* * * * *